United States Patent
Eisen et al.

(10) Patent No.: US 10,289,415 B2
(45) Date of Patent: May 14, 2019

(54) METHOD AND APPARATUS FOR EXECUTION OF THREADS ON PROCESSING SLICES USING A HISTORY BUFFER FOR RECORDING ARCHITECTED REGISTER DATA

(71) Applicant: International Business Machines Corporation, Armonk, NY (US)

(72) Inventors: Susan E. Eisen, Round Rock, TX (US); Cliff Kucharski, Austin, TX (US); Hung Q. Le, Austin, TX (US); Dung Q. Nguyen, Austin, TX (US); David R. Terry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 14/883,253

(22) Filed: Oct. 14, 2015

(65) Prior Publication Data
US 2017/0109166 A1   Apr. 20, 2017

(51) Int. Cl.
*G06F 9/38* (2006.01)
*G06F 9/30* (2018.01)
(Continued)

(52) U.S. Cl.
CPC ...... *G06F 9/30072* (2013.01); *G06F 9/30098* (2013.01); *G06F 9/3857* (2013.01);
(Continued)

(58) Field of Classification Search
CPC ...... G06F 9/3836; G06F 9/384; G06F 9/3851; G06F 9/3861; G06F 9/3857; G06F 9/3885
See application file for complete search history.

(56) References Cited

U.S. PATENT DOCUMENTS 5,384,567 A   1/1995   Hassner et al.
5,581,775 A   12/1996  Katz et al.
(Continued)

FOREIGN PATENT DOCUMENTS

GB   2215883 A   9/1989

OTHER PUBLICATIONS

International Business Machines Corporation, "List of IBM Patents or Patent Applications Treated as Related," Oct. 15, 2015, 2 pages.
(Continued)

*Primary Examiner* — Jacob Petranek
(74) *Attorney, Agent, or Firm* — Patterson + Sheridan, LLP

(57) ABSTRACT

Method and system for restoring results to a register file of a processing unit is provided. An instruction is dispatched in a processing slice of the processing unit, targeting a register file, wherein the processing unit includes two or more processing slices, each processing slice including a corresponding history buffer and at least a portion of a register file. The processing unit evicts previous result data from the register file entry to a history buffer corresponding to the processing slice, by writing new result data into the register file entry, in response to the instruction. The processing unit detects a trigger condition relating to a rollback of the processing unit to a previous state, and restores the previous result data from the history buffer to the register file entry, in response to the trigger.

20 Claims, 12 Drawing Sheets

(51) Int. Cl.
*G06F 12/0875* (2016.01)
*G06F 12/0891* (2016.01)

(52) U.S. Cl.
CPC ........ *G06F 9/3861* (2013.01); *G06F 12/0875* (2013.01); *G06F 12/0891* (2013.01); *G06F 2212/452* (2013.01)

(56) References Cited

U.S. PATENT DOCUMENTS

| | | | |
|---|---|---|---|
| 5,586,294 A | 12/1996 | Goodwin et al. | |
| 5,778,255 A | 7/1998 | Clark et al. | |
| 5,805,906 A * | 9/1998 | Cheong | G06F 9/30141 710/260 |
| 5,860,014 A * | 1/1999 | Cheong | G06F 9/3861 710/260 |
| 5,870,612 A | 2/1999 | Cheong et al. | |
| 6,587,941 B1 * | 7/2003 | Flacks | G06F 9/3836 712/218 |
| 6,708,267 B1 | 3/2004 | Flacks et al. | |
| 6,813,705 B2 | 11/2004 | Duesterwald et al. | |
| 7,254,699 B2 | 8/2007 | Shepherd | |
| 7,395,416 B1 * | 7/2008 | Sathaye | G06F 9/3806 712/218 |
| 7,890,675 B2 | 2/2011 | Aranguren et al. | |
| 7,890,734 B2 * | 2/2011 | Golla | G06F 9/3861 712/214 |
| 8,335,219 B2 | 12/2012 | Simmons et al. | |
| 2006/0130062 A1 * | 6/2006 | Burdick | G06F 9/4881 718/100 |
| 2008/0195850 A1 * | 8/2008 | Abernathy | G06F 9/3802 712/240 |
| 2008/0288819 A1 | 11/2008 | Heller, Jr. | |
| 2011/0320765 A1 * | 12/2011 | Karkhanis | G06F 9/30109 712/7 |
| 2013/0042094 A1 | 2/2013 | Heller, Jr. | |
| 2013/0205052 A1 | 8/2013 | Eyraud et al. | |
| 2014/0189239 A1 * | 7/2014 | Hum | G06F 12/0831 711/122 |
| 2016/0062770 A1 * | 3/2016 | Venkumahanti | G06F 9/3885 712/24 |
| 2016/0132338 A1 * | 5/2016 | Jin | G06F 9/3851 712/206 |

OTHER PUBLICATIONS

Alexander et al., "Distributed prefetchbuffer/cache design for high performance memory systems," Second International Symposium on High-Performance Computer Architecture, Feb. 1996, pp. 254-263.
Anonymously; "A novel squash & recovery mechanism in transactional memory system"; An IP.com Prior Art Database Technical Disclosure; http://ip.com/IPCOM/000196579; Jun. 7, 2010, pp. 1-2.
IBM et al.; "Processor Performance Monitoring with Depiction of the Efficiency of Bus Utilization and Memory Accesses of Superscalar Microprocessor"; An IP.com Prior Art Database Technical Disclosure; http://ip.com/IPCOM/000118371; Apr. 1, 2005, pp. 67-70.

* cited by examiner

METHOD AND APPARATUS FOR EXECUTION OF THREADS ON PROCESSING SLICES USING A HISTORY BUFFER FOR RECORDING ARCHITECTED REGISTER DATA

FIELD

The present invention generally relates to data processing systems, and more specifically, to recovery mechanisms for such systems, particularly to processors having a multi-execution slice architecture.

BACKGROUND

High performance processors currently used in data processing systems today may be capable of "superscalar" operation and may have "pipelined" elements. Such processors typically have multiple elements which operate in parallel to process multiple instructions in a single processing cycle. Pipelining involves processing instructions in stages, so that the pipelined stages may process a number of instructions concurrently.

In a typical first stage, referred to as an "instruction fetch" stage, an instruction is fetched from memory. Then, in a "decode" stage, the instruction is decoded into different control bits, which in general designate i) a type of functional unit (e.g., execution unit) for performing the operation specified by the instruction, ii) source operands for the operation and iii) destinations for results of operations. Next, in a "dispatch" stage, the decoded instruction is dispatched to an issue queue (ISQ) where instructions wait for data and an available execution unit. Next, in the "issue" stage, an instruction in the issue queue is issued to a unit having an execution stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there are buffers to hold execution results before results are deposited into the destination register, and buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the above described processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. An instruction for which an assumption has been made is generally referred to as an "interruptible instruction", and the determination that an assumption is incorrect, triggering the need for the processor state to recover to a prior state, is referred to as an "interruption" or an "interrupt point". In addition to incorrect assumptions, there are other causes of such interruptions requiring recovery of the processor state. Such an interruption is generally caused by an unusual condition arising in connection with instruction execution, error, or signal external to the processor.

SUMMARY

Certain aspects of the present disclosure provide a method for restoring results to a register file of a processing unit. The method generally includes dispatching an instruction, in a processing slice of the processing unit, targeting a register file entry of the register file, wherein the processing unit comprises two or more processing slices, each processing slice comprising a corresponding history buffer and at least a portion of a register file. The method further includes evicting previous result data from the register file entry to a history buffer corresponding to the processing slice, by writing new result data into the register file entry, in response to the instruction, detecting a trigger condition relating to a rollback of the processing unit to a previous state, and restoring the previous result data from the history buffer to the register file entry, in response to the trigger.

Certain aspects of the present disclosure provide a data processing system generally including two or more processing slices, at least one register file and two or more history buffers, each processing slice comprising a corresponding one of the two or more history buffers and at least a portion of the at least one register file. The processing system further includes a logic unit for dispatching an instruction, in a processing slice of the processing unit, targeting a register file entry of the at least one register file, and at least one functional unit for receiving the dispatched instruction and providing new result data for writing into the register file entry, the at least one register file writing the provided new result data into the register file entry. The processing system further includes a history buffer logic unit for writing previous result data, evicted by writing the new result data from the register file entry, to a history buffer corresponding to the processing slice, the logic unit detecting a trigger condition relating to a rollback of the processing unit to a previous state, and restoring the previous result data from the history buffer to the register file entry, in response to the trigger.

Certain aspects of the present disclosure provide a computer program product for restoring results to a register file of a processing unitg. The computer program product generally includes a computer-readable storage medium having computer-readable program code embodied therewith for performing method steps. The method steps generally include dispatching an instruction, in a processing slice of the processing unit, targeting a register file entry of the register file, wherein the processing unit comprises two or more processing slices, each processing slice comprising a corresponding history buffer and at least a portion of a register file. The method further includes evicting previous result data from the register file entry to a history buffer corresponding to the processing slice, by writing new result data into the register file entry, in response to the instruction, detecting a trigger condition relating to a rollback of the processing unit to a previous state, and restoring the previous result data from the history buffer to the register file entry, in response to the trigger.

DETAILED DESCRIPTION

To clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion. It may be noted that a numbered element is numbered according to the figure in which the element is introduced, and is referred to by that number throughout succeeding figures.

Figure 1:
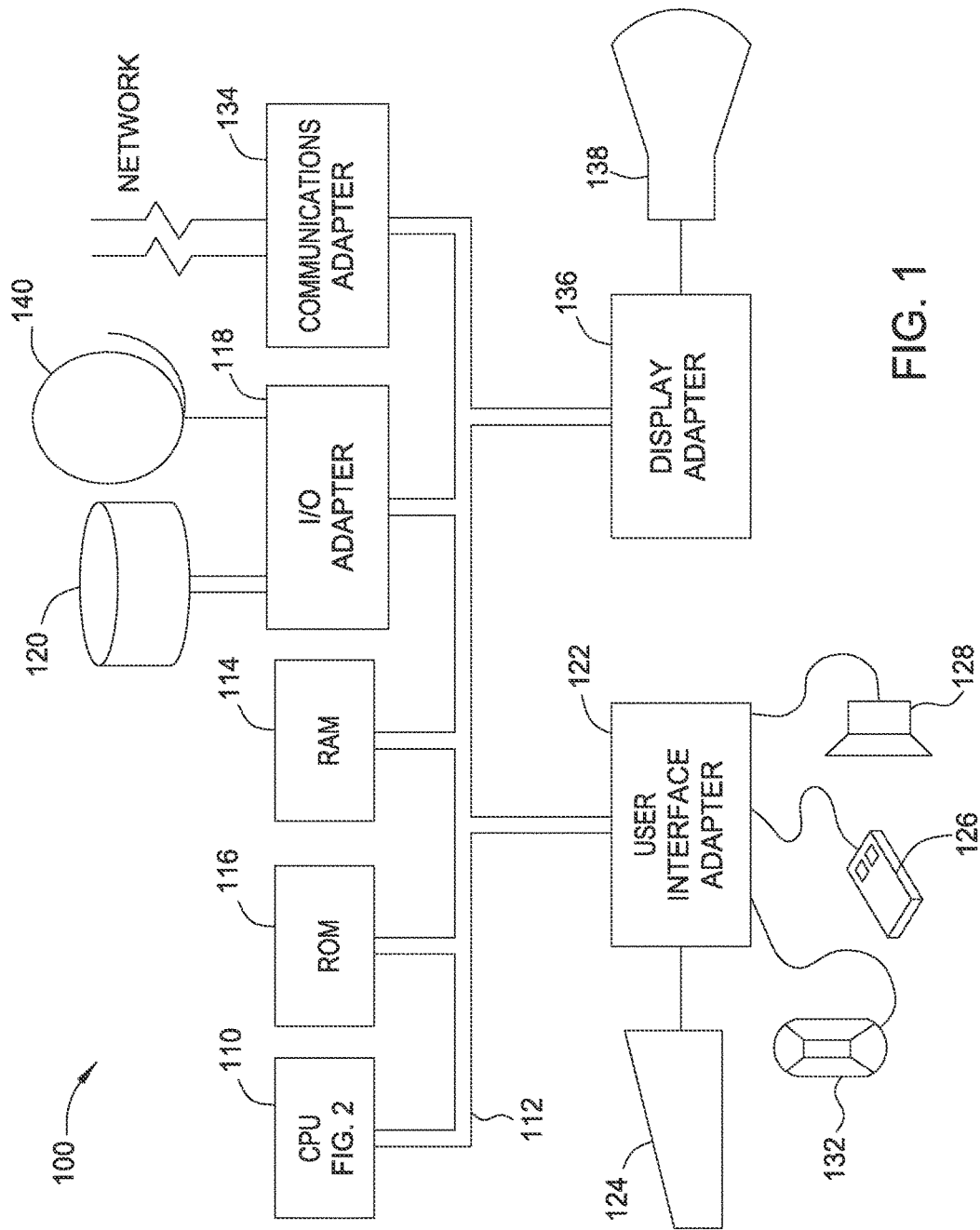
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
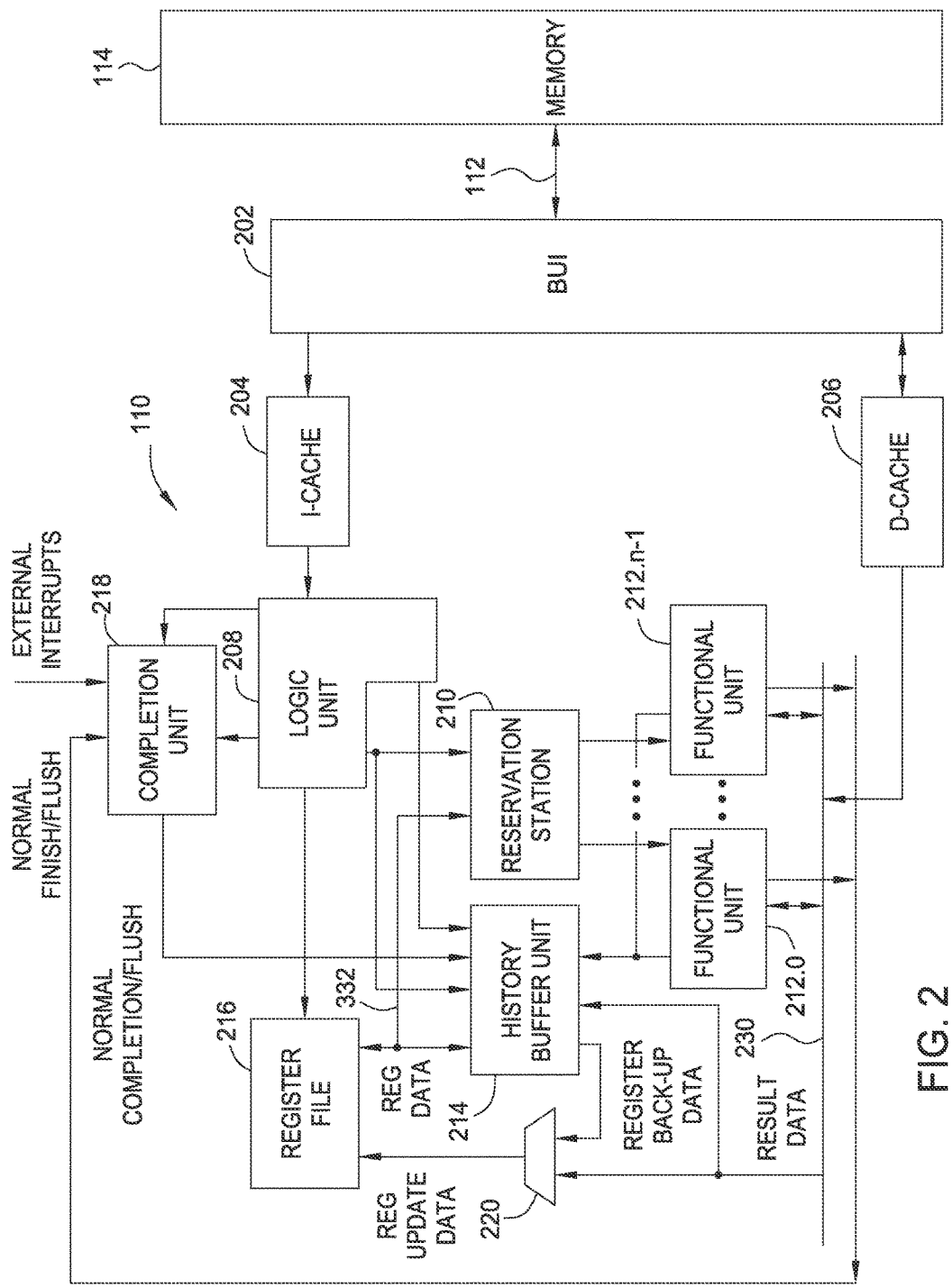
FIG. 2 illustrates a block diagram of a processor in which certain aspects of the present disclosure may be practiced.

FIG. 2 illustrates a block diagram of a processor 110 in which certain aspects of the present disclosure may be practiced. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes fetch, branch processing, instruction buffer, decode and dispatch units. The unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.$n-1$ via reservation station 210. In executing the instructions, the units 212 input and output information to registers (shown collectively as register file 216). The functional units 212 signal the completion unit 218 upon execution of instructions and the completion unit 218 retires the instructions, which includes notifying history buffer (HB) logic 214. As will be explained in detail later, the history buffer (HB) may save a processor state before, for example, an interruptible instruction, so that if an interrupt occurs, HB control logic may recover the processor state to the interrupt point by restoring the content of registers. This use of a history buffer may have the advantage of reducing the timing penalty in register lookup during instruction dispatch as compared to a register renaming scheme. In an aspect, functional units 212 also assert results on one or more result buses (e.g. write back buses) 230 so that the results may be written by one or more write ports 220 to the registers in the register file 216. In addition to notifying the HB logic unit 214 about retired instructions, the completion unit 218 or logic unit 208 may also notify the HB unit 214 about exception conditions and mispredicted branches for which instructions should be discarded prior to completion and for which the HB unit 214 should recover a state of the processor 110 as will be further described below. The HB logic unit 214 may also receive other information about dispatched instructions from the logic unit 208, the register file 216, and one or more functional units 212, relevant aspects of which will be described below.

In certain aspects, a CPU 110 may have multiple execution/processing slices with each slice having one or more of the units shown in FIG. 2. For example, each processing slice may have its own logic unit 208, register file 216, history buffer 214, reservation station 210 and functional/execution units 212. A CPU 110 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

Figure 3:
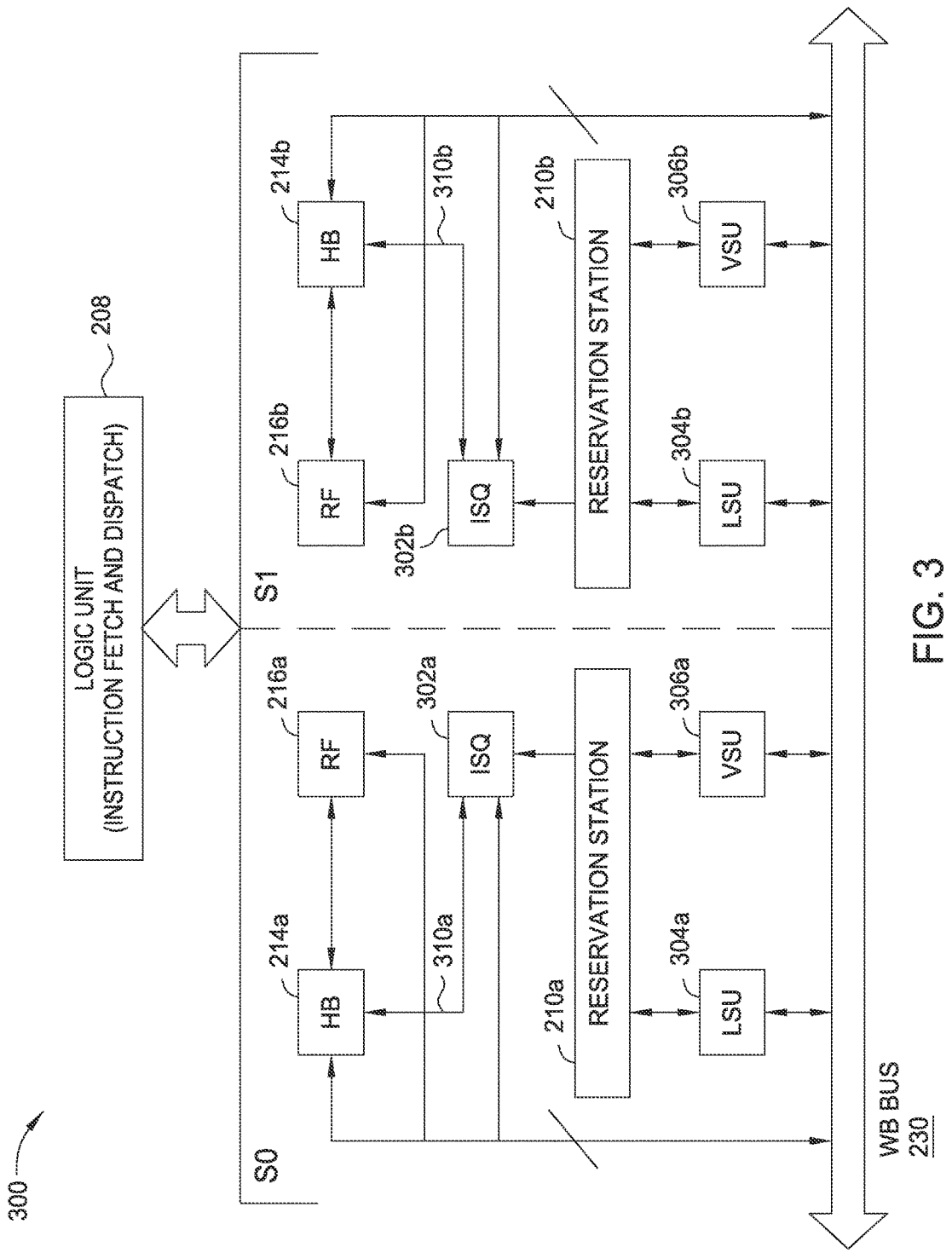
FIG. 3 illustrates a multi-slice processor in accordance with certain aspects of the present disclosure.

FIG. 3 illustrates a logical diagram of a multi-slice processor 300 in accordance with certain aspects of the present disclosure. It may be noted that FIG. 3 only shows portions/components/connections of the multi-slice processor 300 that are relevant for this discussion. As shown in FIG. 3, the multi-slice processor 300 includes two processing slices Slice 0 and Slice 1. Each of the Slices 0 and 1 includes an issue queue (ISQ) (302a and 302b), a reservation station (210a and 210b), execution units including a load store unit (LSU) (304a and 304b), a vector scalar unit (VSU) (306a and 306b), a register file (RF) (216a and 216b), and a history buffer (HB) (214a and 214b). As shown, logic unit 208 may perform instruction fetch and dispatch for the multi-slice processor. In an aspect, the slices 0 and 1 may share one register file 216 having an array of general purpose registers (GPRs). In an aspect, the reservation station includes a bank of register entries. In certain aspects, the ISQ 302 holds a set of instructions and the reservation station accumulates data for the instruction inputs. When an instruction is dispatched, the ISQ 302 may allocate an RF entry for the instruction. The source RF entries required as input for the instruction are looked up and passed on to the reservation station. When all source data accumulates for the instruction, the reservation station passes it on to one or more execution units designated for execution of the instruction. In an aspect, the reservation station is part of the ISQ 302. Each of the LSUs 304 and VSUs 306 may make result data available on the write back buses 230 for writing into an RF entry or HB entry. In an aspect each of the LSUs 304 and VSUs 306 may have a corresponding WB bus 230.

It may be noted that the two slices are shown for ease of illustration and discussion only, and that multi-slice processor 300 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In an aspect, one register file 216 may be allocated per super slice and shared by the processing slices of the super slice.

In certain aspects, the slices 0 and 1 of the multi-slice processor 300 may be configured to simultaneously execute independent threads (e.g., one thread per slice) in a simultaneous multi-threading mode (SMT). Thus, multiple threads may be simultaneously executed by the multi-slice processor 300. In an aspect, a super slice may act as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase processing speed of the multi-slice processor 300.

In certain aspects, each register file (or GPR array) 216 may include a number of RF entries or storage locations (e.g., 32 or 64 RF entries), each RF entry storing a 64 bit double word and control bits. In an aspect, the RF entry may store 128 bit data. In an aspect, a register file is accessed and indexed by logical register (LREG) identifiers, for example, r0, r1, . . . , rn. Each RF entry holds the most recent (or youngest) target result data corresponding to an LREG for providing the result data to a next operation. In an aspect, a new dispatch target replaces a current RF entry. The current RF entry may be moved to the history buffer 214. An RF entry is generally written at dispatch of new target and read at dispatch of source. Further, an RF entry may be updated at write back, restoration (flush), or completion.

As noted above, the history buffer (HB) 214 may save a processor state before, for example, an interruptible instruction, so that if an interrupt occurs, HB control logic may recover the processor state to the interrupt point by restoring the content of registers. In an aspect, HB 214 stores old contents of RF entries when new targets are dispatched targeting the RF entries. In certain aspects, each HB instance 214, may include 48 HB entries, each HB entry including 64 bits (or 128 bits) of data (e.g., matching the length of an RF entry) and control bits.

According to the terminology used herein, when an instruction performs an operation affecting the contents of a register, the operation is said to "target" that register, the instruction may be referred to as a "targeting instruction", and the register may be referred to as a "target register" or a "targeted register". For example, the instruction "ld r3, . . . " targets register r3, and r3 is the target register for the instruction "ld r3, . . . ".

Figure 4:
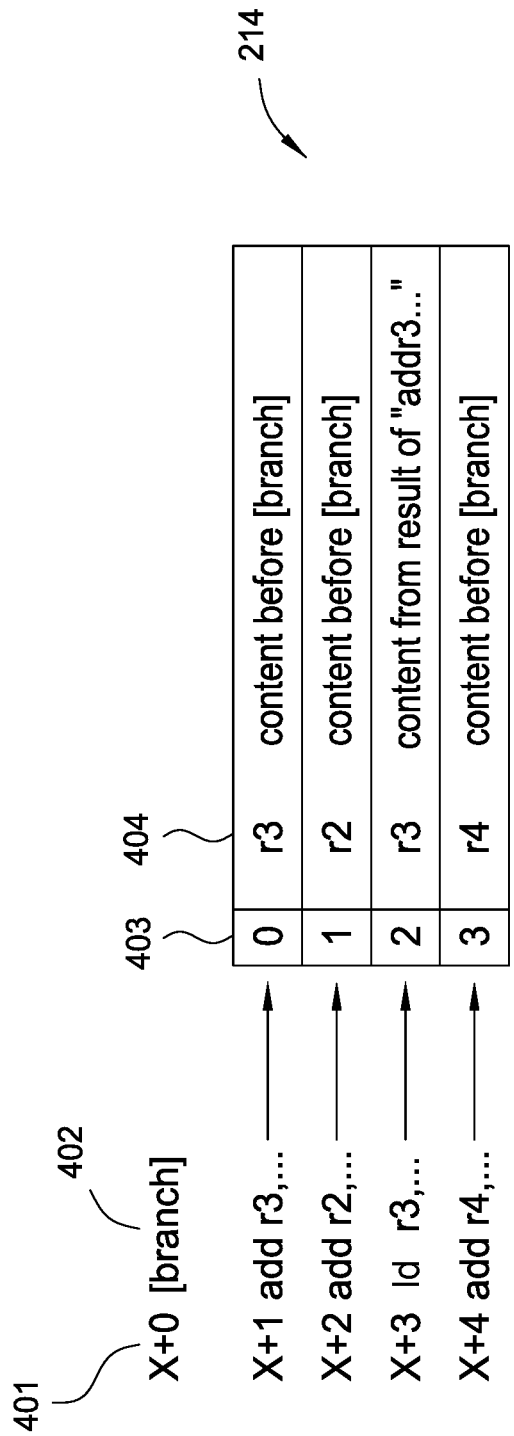
FIG. 4 illustrates an example history buffer as applied to the processing of instructions, in accordance with certain aspects of the present disclosure.

FIG. 4 illustrates an example showing a history buffer 214 as applied to the processing of representative instructions 402 shown. The instructions 402 may reside in a memory device (e.g., memory 114) in a sequence of lines 401 which are depicted in FIG. 4 as line numbers X+0, X+1, etc. The instruction 402 at line X+0 is depicted as "[branch]", signifying that the instruction is representative of a conditional branch type instruction, such as "branch target—addr", for example. The instruction 402 at line X+1 is depicted as "add, r3 . . . ", signifying that the instruction is representative of an instruction such as "add r3, r6, r7" (i.e., r6+r7→r3), for example, which alters the content of register r3.

In certain aspects, upon speculative prediction that the branch type instruction at line X+0 is not taken, instruction "add r3, . . . ", at line X+1, may be dispatched and the value of target register r3 before the branch instruction at X+0 may be saved in a history buffer entry ("HBE") 404. Herein, a history buffer entry may be referred to by its entry number 403. That is, a first entry 404 in a history buffer is referred to as HBE0, a second entry as HBE1, etc. Instructions "add r2, . . . ", "ld r3, . . . ", and "add r4, . . . " may result in history buffer entries HBE1, HBE2, and HBE3 respectively. Notice that HBE2 has the contents of register r3 produced by instruction "add r3, . . . ", because "ld r3, . . . " is dispatched after "add 3, . . . ". There is no instruction dispatched with target r4 except "add r4 . . . "; therefore, HBE3 has the content of r4 produced before the branch.

In certain aspects, if the prediction that the branch at line X+0 is not taken proves to be correct, and the instruction "ld r3, . . . " at line X+1 in this context causes no exception, then the HB 100 entries HBE0, HBE1, etc. may be deallocated in the order of completion. But, if the instruction "ld r3, . . . " causes an exception, the recovery mechanism may restore register content for r3 and r4 from HBE2 and HBE3, and deallocate those HB entries. The processor will thus be restored to the state immediately before the "ld r3, . . . " instruction was dispatched. The state at that point includes register r3 with contents produced by "add r3, . . . ", and the content of r4 before the branch (which is the same as its content before the "ld r3, . . . " instruction).

If the prediction that the branch is not taken proves to be incorrect, then results must be abandoned for the results that were produced by speculatively executing instructions after the branch instruction. The registers written by these instructions need to be restored to their contents prior to the branch instruction. For example, if the branch is resolved after writing into HBE 3, the recovery mechanism may copy register content in HBE0, HBE1 and HBE3 back to registers r3, r2 and r4 in order to recover the processor state that existed before the branch. Also, in connection with completing the recovery, all four HBE's may be deallocated.

In certain aspects in addition to interruptions arising from speculative execution of instruction, an interruption may also be caused by an unusual condition arising in connection with instruction execution, error, or signal external to the processor 110. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 114 or disk 120, 6) attempting to access storage, including RAM 114 or disk 120, with an invalid effective address alignment, or 7) a System Reset or Machine Check signal from a device (not shown) directly connected to the processor 110 or another device in the system 100 connected to the processor 110 via the bus 112.

In many cases, such as in the above example, it is problematic to implement the mechanism of FIG. 4 because the HB 100 may contain multiple values of a given register. For example, as shown in FIG. 1 the HB 100 has values of r3 in HBE0 and HBE2. The HB 100 contains both these values because in different contexts either value of r3 may need to be recovered. In an aspect, all valid entries in the RF 216 may be marked when any new interruptible instruction is dispatched. Once an RF entry is marked, whatever was in the RF now represents the "old" value. However, content of the marked RF entries remain in the RF as long as they contain the youngest data. For example, if register r5 is not written after a branch, the "old" r5 checkpoint value is still the youngest value and still resides in the RF. Thus r5 does not need to be restored in the case of a mispredict on that branch. In an aspect, only the first time an RF entry is targeted at or after a checkpoint, the old value is copied from the RF to the HB. Additional writes to that target RF entry (e.g., younger result data) may remain in the RF and may not touch that old restore value in the HB. In other words, there may be one checkpoint value per register per interruptible point. However multiple interruptible points may be present, and therefore, multiple restore values for a given RF entry may be expected to be stored in the HB.

Therefore, the need exists to select between multiple values of a RF entry from the HB 214, in recovering the processor state. One possible solution is to exhaustively reverse the order of speculative execution back to the interrupted instruction. This way, if recovery is required all the way back to line X+0, for example, the r3 content from HBE 0 will overwrite the content from HBE 2, and the processor will have recovered back to the known state before the branch at x+0.

However, a disadvantage of this mechanism is that the processor is stalled for a number of cycles while this iterative process recovers the processor state. Because branch misprediction may occur frequently, the multi-cycle stall penalty may not be acceptable in a high performance processor. If, in spite of this limitation, a history buffer is used for recovering a processor state, a need exists for improving the efficiency of recovering the processor state from information stored in the history buffer, including improving the history buffer multi-cycle stall penalty.

In certain aspects, in case of a multi-slice architecture shown in FIG. 3, each instruction may be dispatched to any of the processing slices (e.g., slices S0 or S1), for example, in a single thread mode when both slices of a super slice are executing a single thread. Since source data for executing an instruction must be available in the register file of the processing slice executing the instruction, each register file 216 of each processing slice must have the exact same state (i.e., in sync) after execution of each instruction in one of the processing slices. In other words, each of the register files 216 must be identical. For example, instruction 402 at line X+1 targeting register r3 may be dispatched to slice S0, and instruction 402 at line X+2 targeting register r2 may be dispatched to slice S1. Now, if the add operation at line X+2 is r3+r5→r2, this instruction must read the content of r3 written by the previous add instruction at line X+1. If the result data of the instruction at line X+1 is written only in the RF 216a of slice S0, this result data will not be available in RF 216b of slice S1 for reading by the instruction at line X+2 for execution in slice S1. Thus, result data for each executed instruction must be written into every corresponding RF entry of all the processing slices executing a thread. And thus, all register files 216 within the same thread have to look at all dispatches to that thread. In an aspect, each slice may determine the youngest target across the dispatch bus and write their own RF entries with the same, identical youngest data.

In certain aspects of the present disclosure, in a single thread mode, HBs 214 may be unique in each slice, and all HB instances 214 of a multi-slice processor 300 may be used in parallel across all execution slices to increase the total pool of HB entries available to that thread. So, unlike the register files 216, the HBs 214 of the processing slices need not be identical, and the single thread mode may take advantage of the multiple HBs 214 available to the multiple slices executing the single thread. For example, by having one HB per slice in a super slice, a thread (e.g., in a single thread mode) has twice as many HB entries available, allowing more instructions to be simultaneously executed. For example, the result of the instruction at line X+1 may write the previous content of r3 to HB 214a of slice S0. Further the instruction at line X+2 may write the previous content of r2 to HB 214b of slice S1. In an aspect, since the register files 216 must be identical, restoration of content from each HBE must write the HBE content to register files 216 of every processing slice being used to execute the thread. However, restoration of HBE content to the register files 216 of each processing slice based on existing mechanisms may lead to extensive amount of wiring to send from each HB 214 to the processing slices, which may not be feasible.

In certain aspects, unlike RF entries 216, HBEs 214 may not be identified by LREG identifiers, since the HBs may have multiple entries corresponding to each RF entry. In certain aspects, each instruction may be assigned a unique result tag (e.g., Instruction Tag, ITAG) associated with the target register at dispatch. When an instruction with target registers (e.g., RF entry) is dispatched, the result tag may be written into a tag field associated with the target register, and the prior target register content and the prior result tag may be retrieved from the RF entry and stored in a history buffer entry (HBE) allocated for it. In an aspect, the ITAG may uniquely identify each HBE corresponding to a register file entry.

Figure 5:
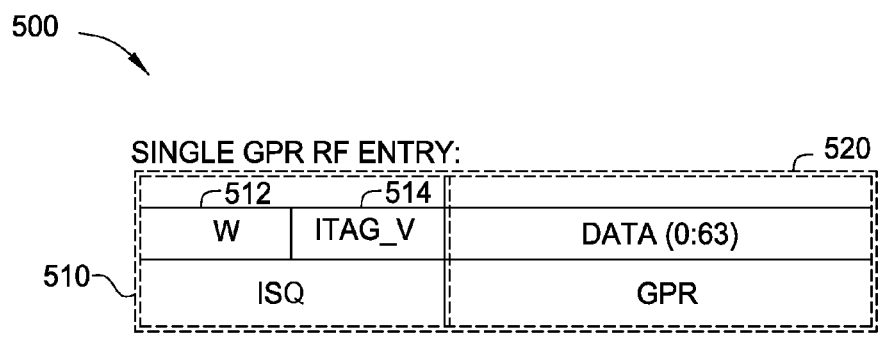
FIG. 5 illustrates contents associated with a General Purpose Register (GPR) Register File (RF) entry, in accordance with certain aspects of the present disclosure.

FIG. 5 illustrates contents associated with a GPR RF entry 500, in accordance with certain aspects of the present disclosure. FIG. 5 shows a split between data 520 held by the RF entry and control/status information 510 associated with the RF entry. In an aspect, the control/status bits 510 may be stored within the RF entry 500 or may be maintained separately as part of another unit of the processor 300 (e.g., ISQ). As noted above, the RF entry 500 may store a double bit of 64 bits. The control/status information may include ITAG_V (including an ITAG value and Valid bit) 514 that identifies the instruction that wrote the data 520 in the RF entry 500. Valid (V) bit portion of the ITAG_V 514 indicates if the ITAG value is valid or not. In an aspect, an RF entry 500 is created when an instruction is dispatched. A unique ITAG is assigned to the instruction (e.g., by logic unit 208) and this ITAG is written into the created RF entry. Further, the V bit corresponding to the ITAG is set to 1. Result data 520 corresponding to the instruction, may be written into the created RF entry 500 via a write back procedure, as explained later. Written (W) bits 512, indicate whether data 520 is received from the write back buses 230 and available in the RF entry 500 or not. In an aspect, each W bit 512 corresponds to one write back bus. In an aspect, the control/status bits 510 may include a producer bit (not shown) that indicates whether result data is delivered by one or more LSUs 304 or a VSU 306.

Figure 6:
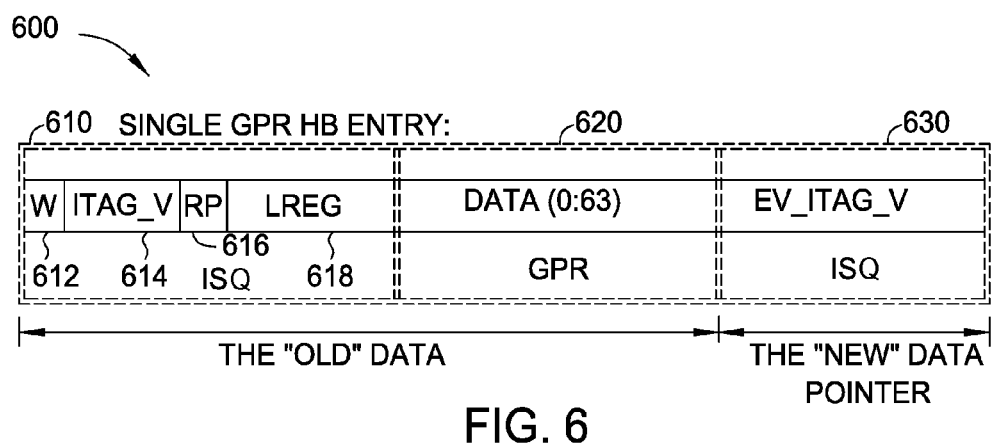
FIG. 6 illustrates contents associated with a history buffer entry (HBE), in accordance with certain aspects of the present disclosure.

FIG. 6 illustrates contents associated with a history buffer entry (HBE) 600, in accordance with certain aspects of the present disclosure. FIG. 6 shows a split between data 620 (old data of a corresponding RF entry 500) held by the HBE 600, control/status information 610 associated with the old data 620 stored in the HBE 600, and control/status information 630 associated with current data stored in the corresponding RF entry 500. In an aspect, the control/status bits 610 and 630 may be stored within the HBE 600 or may be maintained separately as part of another unit of the processor 300 (e.g., ISQ). As noted above, the HBE 600 may store a double bit of 64 bits. The control/status information 610 may include ITAG_V (including an ITAG value and Valid bit) 614 that identifies an instruction to which data 620 corresponds to. Valid (V) bit portion of the ITAG_V 614 indicates if the ITAG value is valid or not. LREG 618 identifies a corresponding RF entry 500 to which data 620 is to be restored to, in the event of an exception or interruption. In an aspect, a HBE 600 may be created when an instruction is dispatched. A unique ITAG may be assigned to the instruction (e.g., by logic unit 208) and this ITAG may be written into the created HBE 600 as ITAG 614. Further, the V bit corresponding to the ITAG 614 may be set to 1. Result data 620 corresponding to the instruction, may be written into the HBE 600 from the RF entry 500. In an aspect, the HBE entry may be modified via an HB write back procedure, as explained later. Written (W) bits 612, indicate whether data 620 as received from the write back buses 230 is available in the HBE 600 or not. In an aspect, each W bit 612 corresponds to one write back bus. In an aspect, the control/status bits 610 may include a producer bit (not shown) that indicates whether result data is delivered by one or more LSUs 304 or a VSU 306. The Restoration Pending (RP) bit 616 may be set to indicate that data 620 needs to be restored to the corresponding RF entry 500 indicated by the LREG 618 field, upon an exception or interruption.

In an aspect, control/status information 630 includes an evictor ITAG (EV_ITAG_V) identifying an instruction that evicted the current data 620 to the HBE 600 and stored a current data in the corresponding RF entry 500. The V bit of the EV_ITAG_V indicates if the EV_ITAG is valid or not.

In certain aspects, in case of RF write back, a VSU 306 may generate the entire 64 bit data at one time (e.g., in one cycle), which may be received on one of the write back buses 230 corresponding to the VSU 306, and written into the RF entry 500. However, multiple LSUs (e.g., 304a and 304b) may produce result data 520 for the single RF entry 500. Since LSUs 304 may need to retrieve the data 520 from memory (e.g., memory 114) for loading into the RF entry 300, all LSUs retrieving data 520 for the RF entry 500 may not be able to make their portion of the data 520 on their corresponding write back buses 230 at the same time. Each W bit 512 may keep track of the portion of the data 520 received from a corresponding LSU 304, and the W bit 512 may be set upon the corresponding portion of the data loaded into the RF entry 500. In an aspect, if the producer bit indicates a VSU result, then all the 4 W bits 512 may be set at the same time, as the entire data may be received on a WB bus 230 corresponding to a VSU 306. In certain aspects, the above may apply to setting W bits upon HB write back.

As noted above, when an instruction is dispatched, the ISQ 302 may allocate an RF entry for the instruction, and the source RF entries required as input for the instruction are looked up and passed on to the reservation station 210.

When all source data accumulates for the instruction, the reservation station 210 passes it on to one or more execution units (e.g, LSU 304 or VSU 306) designated for execution of the instruction. This mechanism of reading contents of source RF entries and passing them on to the reservation station 210 may be referred to as dispatching a source. In an aspect, dispatching a source may include reading data 520 and control/status information 510 of one or more source RF entries and passing on this information to the reservation station 210. In an aspect, if the W bits 512 of a source RF entry are all set to 1, the ISQ 302 will know that the source data is ready and available in the reservation station. The instruction is then ready and eligible to be issued to the execution unit. On the other hand, if the one or more W bits are set to 0, the ISQ 302 will know that the source data is not available or partially available, and may monitor ITAG/V broadcasts on the write back buses 230 to update the source data field 520. In an aspect, W bits 512 set to 1 and ITAG_V bit set to 0 indicates the RF entry 500 is holding architected data, indicating that the corresponding instruction has been retired.

In certain aspects, dispatching a target includes overwriting a target RF entry 500 with target result data, in response to dispatching an instruction targeting the RF entry 500. As noted above, the content evicted out of the RF entry 500 as a result of the overwriting may be stored into an HBE 600, for example, if the instruction targeting the RF entry 500 is interruptible and is marked. In certain aspects, dispatching a target may include reading the current contents of the target RF entry 500 (data and control/status bits) and writing the current data and at least a portion of the current control/status bits to an HBE 600. For example, the ITAG corresponding to the current contents of the RF entry 500 may be copied to the HBE. Further, the ITAG V bit of the HBE 600 may be set to 1. In an aspect, the current data (or at least a portion thereof) from the RF entry 500 may be written into the HBE 600 via HB write back using the write back buses 230, as further explained below, and the W bits at the HBE may be set to 1 when the HB write back is complete. The target dispatch may further include overwriting the target RF entry 500 with new result data. This may include writing the ITAG value of the targeting instruction, setting the V bit to 1, and setting the W bits to 0 at the RF entry 500. The W bits at the RF entry 500 may be set to 1 when the new result data is written via the write back buse(s) 230, as further explained below. In an aspect, the ITAG of the targeting instruction may be saved as evictor ITAG in the corresponding HBE entry that stored the previous result data of the target RF entry 500.

Figure 7:
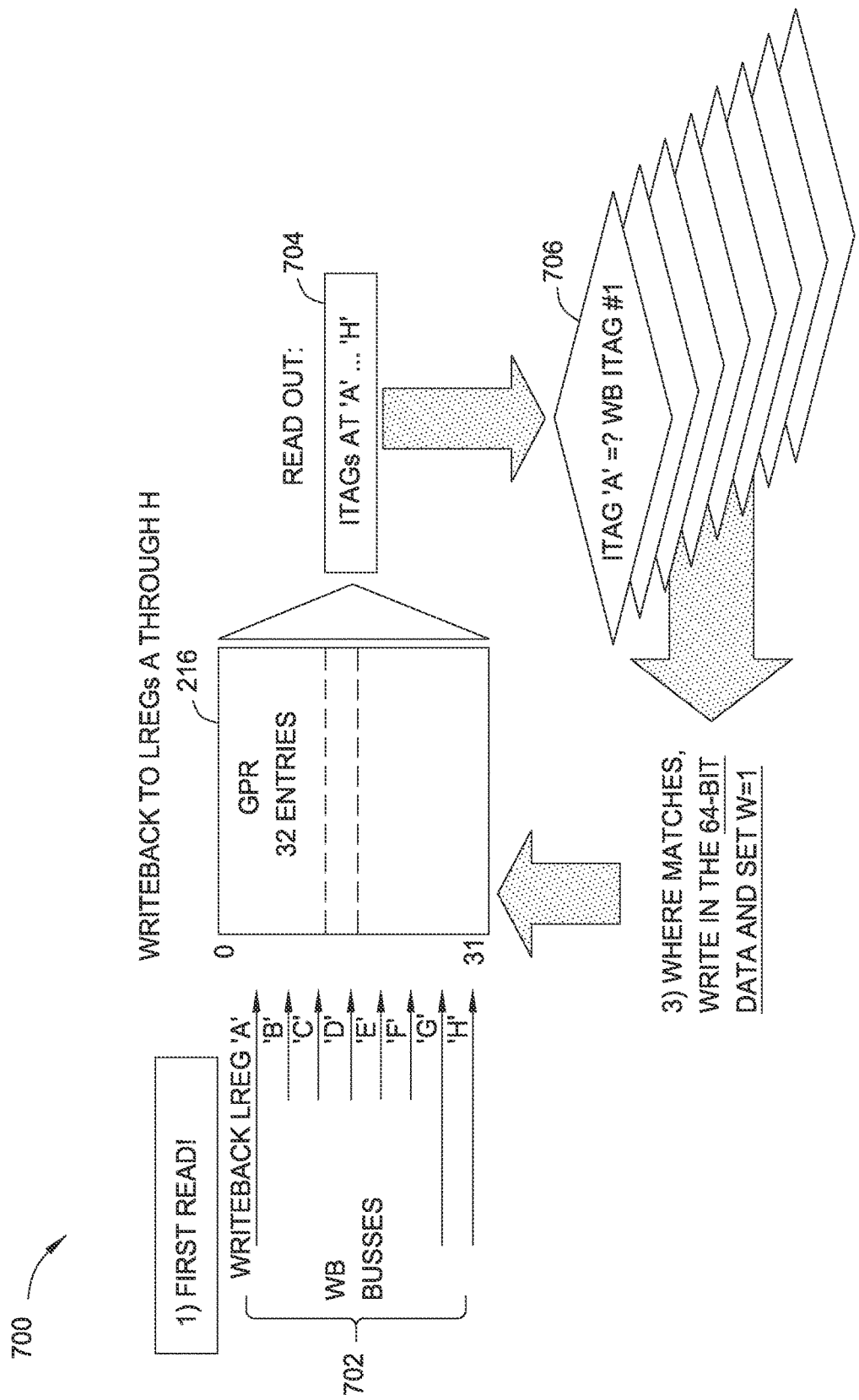
FIG. 7 illustrates RF write back procedure, in accordance with certain aspects of the present disclosure.

FIG. 7 illustrates RF write back procedure 700, in accordance with certain aspects of the present disclosure. The scenario considered in FIG. 7 is of a multi-slice processor having 8 processing slices (4 super slices) that can produce 8 individual results per cycle (e.g., in a single thread mode). Each of the eight write back buses 702 corresponds to an execution unit producing result data. In certain aspects, in addition to the result data, each write back bus 702 may carry the LREG identifier of the RF entry to be written with the result data. For example, the write back buses 702 carry result data for LREGs A-H. Each write back bus 702 may also carry the ITAG of the targeting instruction (not shown). For example, the write back buses 702 may carry write back WB ITAGs 1-8. In an aspect, the RF write back procedure 700 may include reading (at 704) ITAGs of each of the RF entries identified by LREGs A-H, and comparing (at 706) the read ITAG with each of the eight write back ITAGs, eight ITAG compares for each read RF entry ITAG. In an aspect, upon an RF entry ITAG matching with a write back ITAG, the result data from the WB bus is written in to the RF entry and a corresponding W bit is set. In an aspect, by including the LREG identifiers of the RF entries in the write back buses 702, ITAG compares may be performed only on a maximum of eight RF entries identified by the LREG identifiers, instead of comparing each WB ITAG with each of the 32 RF entries of the register file.

Figure 8:
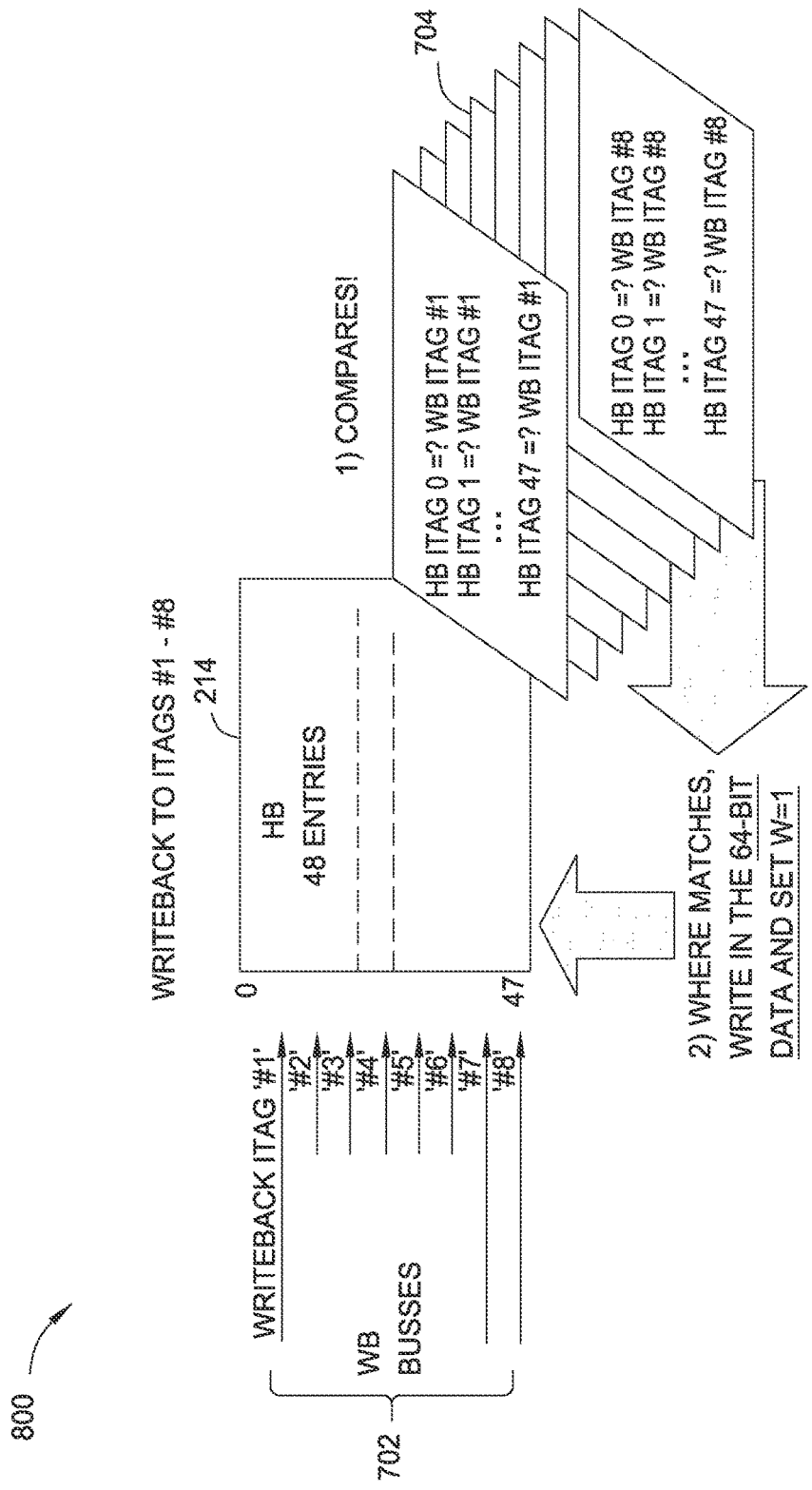
FIG. 8 illustrates a history buffer write back procedure, in accordance with certain aspects of the present disclosure.

FIG. 8 illustrates a history buffer write back procedure 800, in accordance with certain aspects of the present disclosure. As shown in FIG. 7 and discussed above, each of the eight write back buses 702 corresponds to an execution unit producing result data. However, unlike RF write back, carrying LREG identifiers on the WB buses may not be helpful to cut down the number of ITAG compares, since the HB instances of the multi-slice processor may (individually or collectively) carry multiple values corresponding to each RF entry. Thus, in an aspect the HB 214 may be indexed by ITAG compares. As shown in FIG. 8, each of the WB buses carries a WB ITAG (e.g., WB ITAGs 1-8). As shown at 704, as part of the HB write back 800, each HBE ITAG may be compared with each WB ITAG, and an HBE may be written with result data upon an ITAG match. Also, a corresponding W bit may be set to 1 upon writing result data into the HBE. In an aspect, none of the other control/status bits may change upon HB write back.

Figure 9:
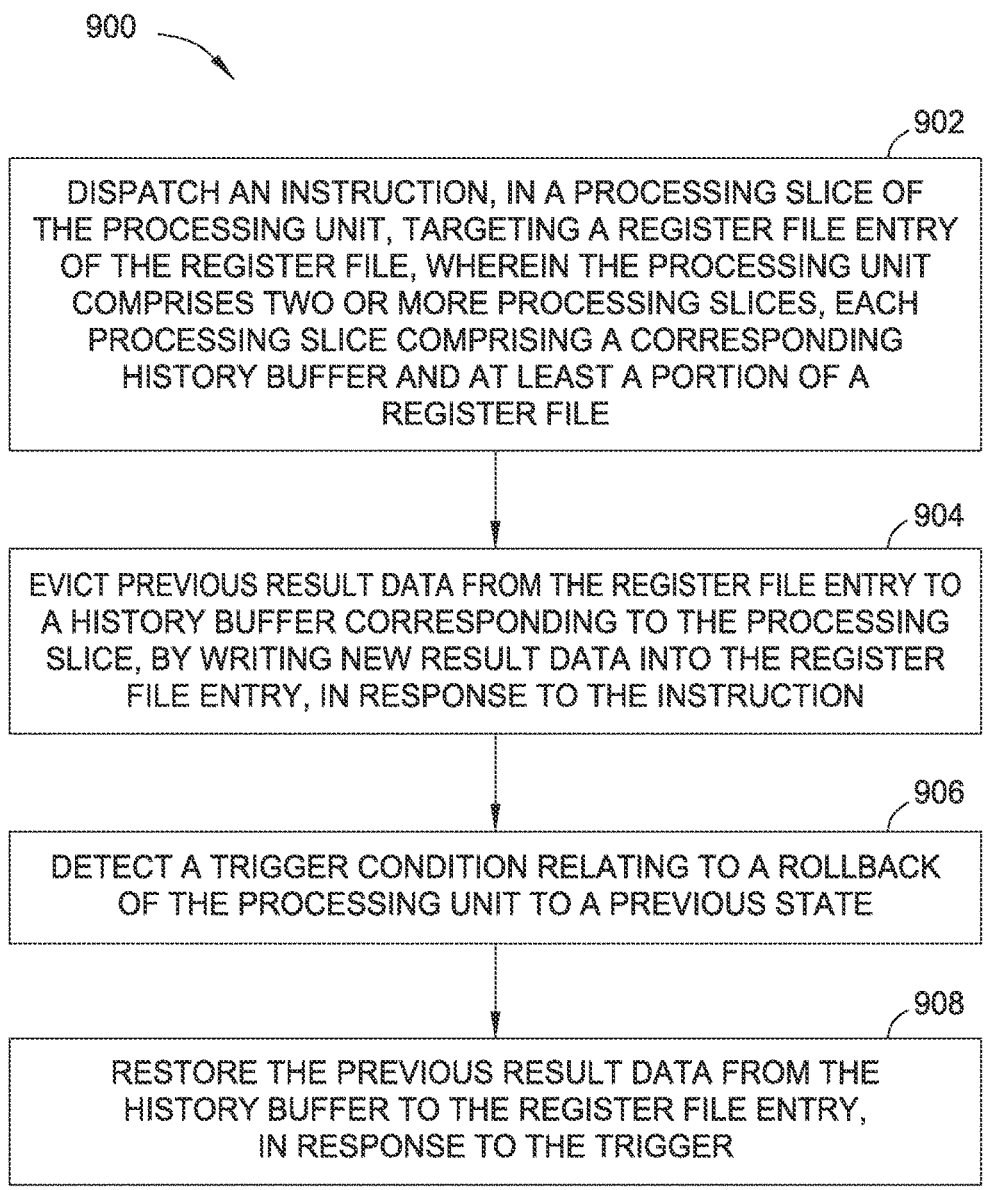
FIG. 9 illustrates operations that may be performed by a processing unit for restoring results to a register file of the processing unit, in accordance with certain aspects of the present disclosure.

FIG. 9 illustrates operations 900 that may be performed by a processing unit for restoring results to a register file of the processing unit, in accordance with certain aspects of the present disclosure. Operations 900 may begin, at 902, by dispatching an instruction, in a processing slice of the processing unit, targeting a register file entry of the register file, wherein the processing unit includes two or more processing slices, each processing slice comprising a corresponding history buffer and at least a portion of a register file. At 904, the processing unit may evict previous result data from the register file entry to a history buffer corresponding to the processing slice, by writing new result data into the register file entry, in response to the instruction. At 906, the processing unit may detect a trigger condition relating to a rollback of the processing unit to a previous state. At 908, the processing unit may restore the previous result data from the history buffer to the register file entry, in response to the trigger. In certain aspects, a history buffer logic unit controls writing previous result data evicted from the register file entry into the history buffer, for example, via HB write back discussed above. In certain aspects a logic unit (e.g., logic unit 208) of the processing unit may detect the trigger condition relating to the rollback and take measures to restore the previous result data to the register file entry.

In certain aspects, processing a restore in a HB 214 may include marking all entries of the HB that need to be restored and moving them to the RFs 216. In an aspect, marking an HBE may include identifying the HBE for restoration based on an exception, interruption, etc. For example, the logic unit 208 may detect an exception or interruption, and may determine one or more HBEs for restoration to RFs by signaling the HB to perform a flush and restore operation. The logic unit 208 may send flush ITAG for the HBEs to the respective HB instances storing the result data to be restored. In an aspect, a HB logic unit within each HB may mark one or more HB entries based on the received flush ITAG information from the logic unit 208. In certain aspects, flush requires two different ITAG compares. A first ITAG compare may include comparing the HB entry ITAG to a flush ITAG. If the ITAG of an HB entry is lesser/equal to the flush ITAG, then it may be considered flushed and the Valid bit may be turned off. The second comparison may include comparing the evictor ITAG with the flush ITAG. Once the evictor ITAG is lesser/equal to the flush ITAG and the HB ITAG is older than the flush ITAG, then the HB will be marked for restore. The HB logic unit may then emulate issuing an instruction by sending, to the ISQ 302, the ITAG of an HBE and control/status bits along with the data to be restored. As shown in FIG. 3, restore data and control/status bits may be conveyed by the HB 214 to the ISQ 302 via link 310. The ISQ 302 may then issue an instruction based on the control/status bits received from the HB for loading the data into the RF entry via the execution units (e.g., LSUs 304) and the write back buses 230, as in case of a regular load instruction. In this way the already existing processor infrastructure and procedures may be used for the restoration, instead of designing extra circuitry for restoring content of each HBE to all RFs of a multi-slice processor. However, in an aspect, the RF must know the difference between a regular write back and a restore write back. As discussed above, in a regular write back, the RF compares its ITAG with the ITAG of the write back result bus, and writes the data if the ITAGs match. But, during the restore, the ITAG compare has to be bypassed and the RF entry must be written without an ITAG match. For example, as noted above, each HBE carries the LREG identifier of the target RF entry for restoration. This LREG identifier may be conveyed as part of the restore instruction dispatch, and may be carried by the write back buses 230. In an aspect, the restore data may be directly written in to the RF entry identified by the target LREG carried by the write back bus.

Figure 10:
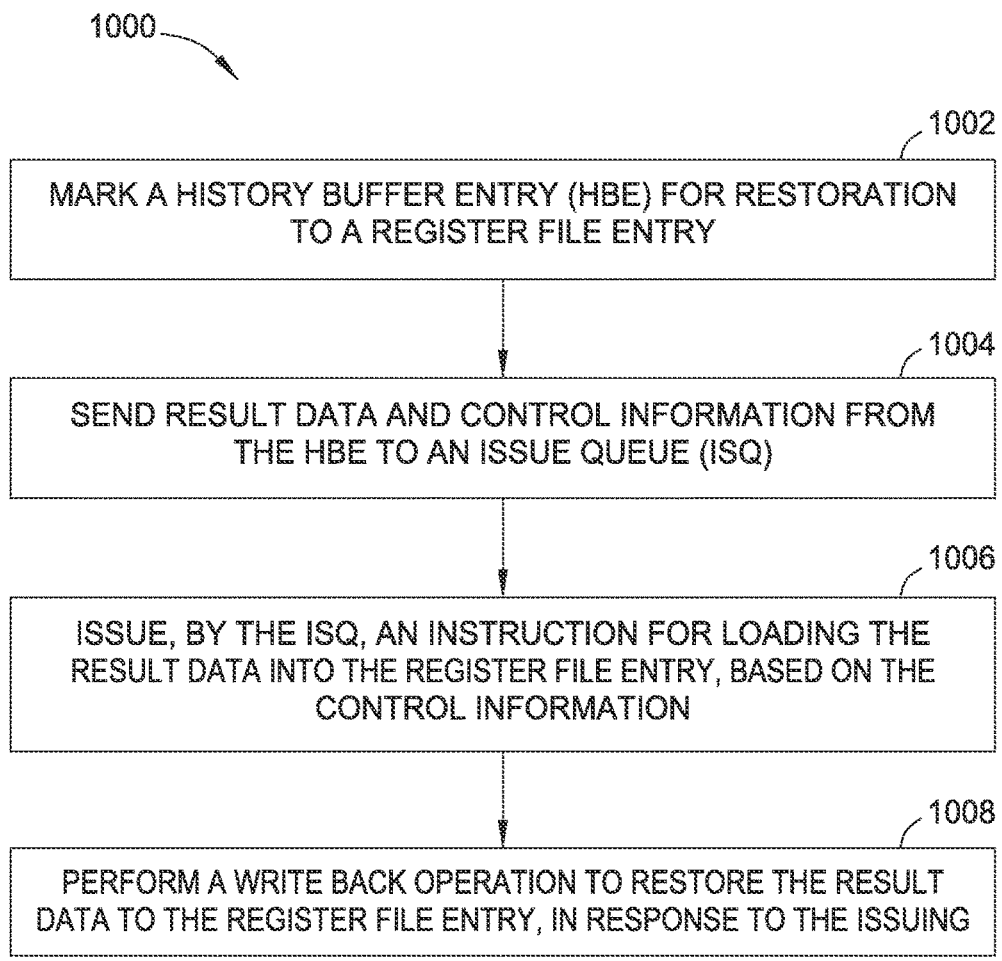
FIG. 10 illustrates operations that may be performed by a processing unit for restoring data to a register file of the processing unit, in accordance with certain aspects of the present disclosure.

FIG. 10 illustrates operations 1000 that may be performed by a processing unit for restoring data to a register file of the processing unit, in accordance with certain aspects of the present disclosure. Operations 1000 may begin, at 1002, by marking a HBE for restoration to a register file entry. At 1004, the processing unit may send result data and control information from the HBE to an ISQ. AT 1006, the ISQ may issue an instruction for loading the result data into the register file entry based on the control information. At 1008, the processing unit may perform a write back operation (e.g., at the history buffer) to restore the result data to the register file entry, in response to issuing of the instruction.

In certain aspects, when an instruction has finished executing, it may be considered completed and may be retired. Completion of an instruction indicates that there may be no further exceptions requiring restore, and the state of the processor (e.g., defined */by one or more RF entries) becomes the architected state. Thus, in an architected state any older result corresponding to an RF entry stored in an HB instance is not needed. In an aspect, an HB entry needs to remain valid in the HB until its evictor completes, because there may be a flush point between the HB entry and the evictor in the RF, needing possible restore. Thus, until the evictor completes and the state of the evictor RF entry becomes the architected state, the previous HB entry needs to remain valid.

In certain aspects, completion requires two different ITAG compares. A first ITAG compare may include comparing the HB entry ITAG to a completion ITAG. If the ITAG of an HB entry is lesser/older than the completion ITAG, then it may be considered completed and the Valid bit may be turned off. But the Valid for the evictor remains set because an entry cannot be cleared until the evictor is also completed. The second comparison may include comparing the evictor ITAG with the completion ITAG. Once the evictor ITAG is lesser/older or equal to the completion ITAG, then the Valid bit for the evictor and the W bits may also be turned off. In certain aspects, the completion ITAG may be issued by the completion unit 218 upon a decision that an instruction corresponding to the ITAG is complete.

Figure 11:
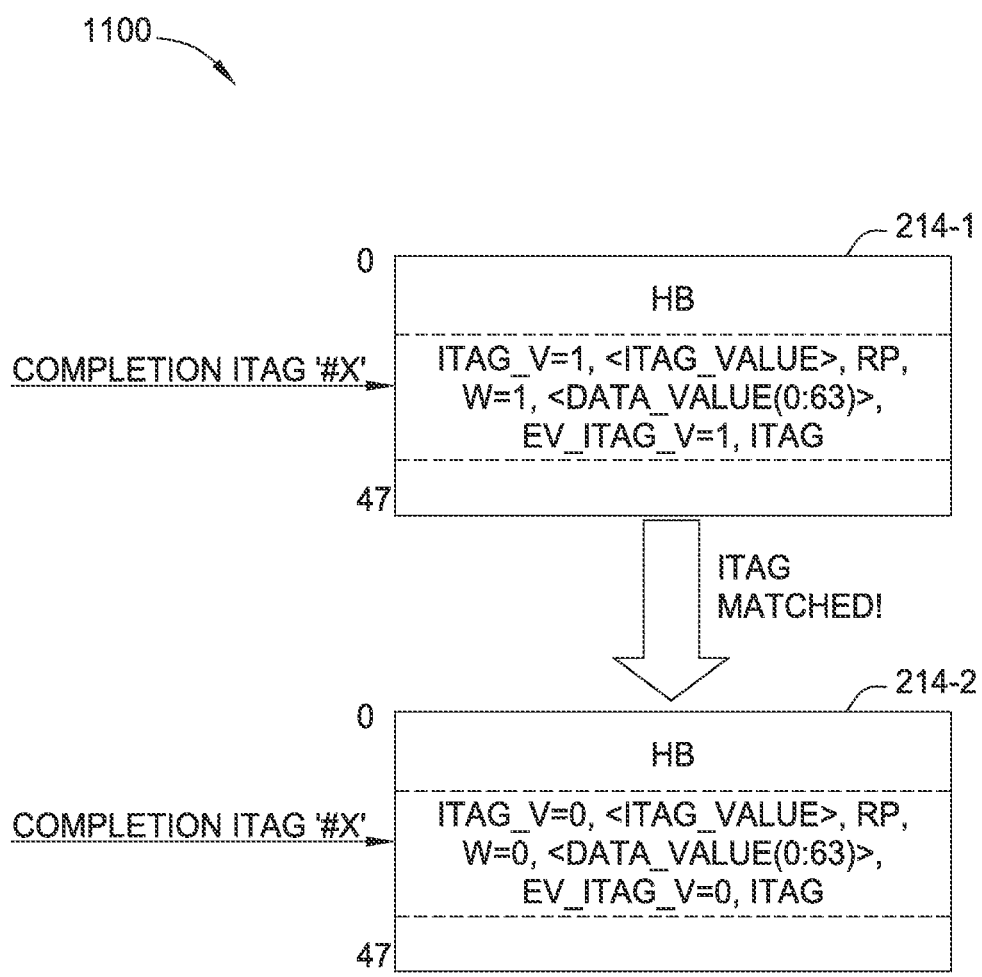
FIG. 11 illustrates completion of a history buffer entry, in accordance with certain aspects of the present disclosure.

FIG. 11 illustrates completion 1100 of a HBE in accordance with certain aspects of the present disclosure. HBE 214_1 shows the control/status bits of the HBE before completion, and HBE 214_2 shows the control/status bits of the HBE after completion. As discussed above, completion includes comparing ITAG value and evictor ITAG value of the HBE 214 with the completion ITAG issued, for example, by the completion unit 218. If both the ITAG value and the evictor ITAG values are found older than the completion ITAG, the HBE entry is no longer needed as it is older than the architected state of the RF entry corresponding to the HBE 214. As the completed instruction is retired upon completion, the ITAG value corresponding to the instruction is no longer needed, and thus, as shown in FIG. 11, the valid bits of both ITAG and evictor ITAG are turned off (e.g., set to 0). In addition, the W bits are also turned off (e.g., set to 0) indicating that the HBE entry is not available for reading.

In certain aspects, to maintain the logic of an instruction sequence, regardless of the order of dispatch of the instructions, e.g., sequentially, out of order, or in parallel to multiple processing slices, the results stored in the HB and RF (state of the buffers) after execution of an instruction block must be the same regardless of how the instructions are dispatched and executed by the slices.

Table-1 illustrates an example dispatch of two targets to the same LREG (RF entry) 'X' in one cycle, simultaneously to two processing slices S0 and S1 of a multi-slice processor. Both the instructions are interruptible, and previous ("old") data in the RF entry is also interruptible.

TABLE 1

| Initial State: Current ("old") data in the GPR RF entry: | | |
|---|---|---|
| RF entry, all slices | Entry X = <data 'A'> | ITAG 'A' |
| Cycle 0: | | |
| Dispatch Slice 0 | ld gpr X <– "immediate" | ITAG 'B' |
| Dispatch Slice 1 | ld gpr X <– "immediate" | ITAG 'N' |

Ideally, if the above instructions at ITAG B and ITAG N are executed sequentially in two cycles, HB in Slice 0 will be written with old ITAG A data, HB in slice 1 will be written with intermediate old ITAG B data, and all RFs (of all slices) will be updated with ITAG N data. However, even if the two loads are executed in a single cycle, to maintain the logic of the instruction sequence, the history buffers must look the same as if two loads happened on different cycles. In certain aspects, this may be accomplished by writing the old ITAG A data directly into HB of Slice 0 bypassing the RF, and writing the ITAG B data into the RF entry.

Figure 12:
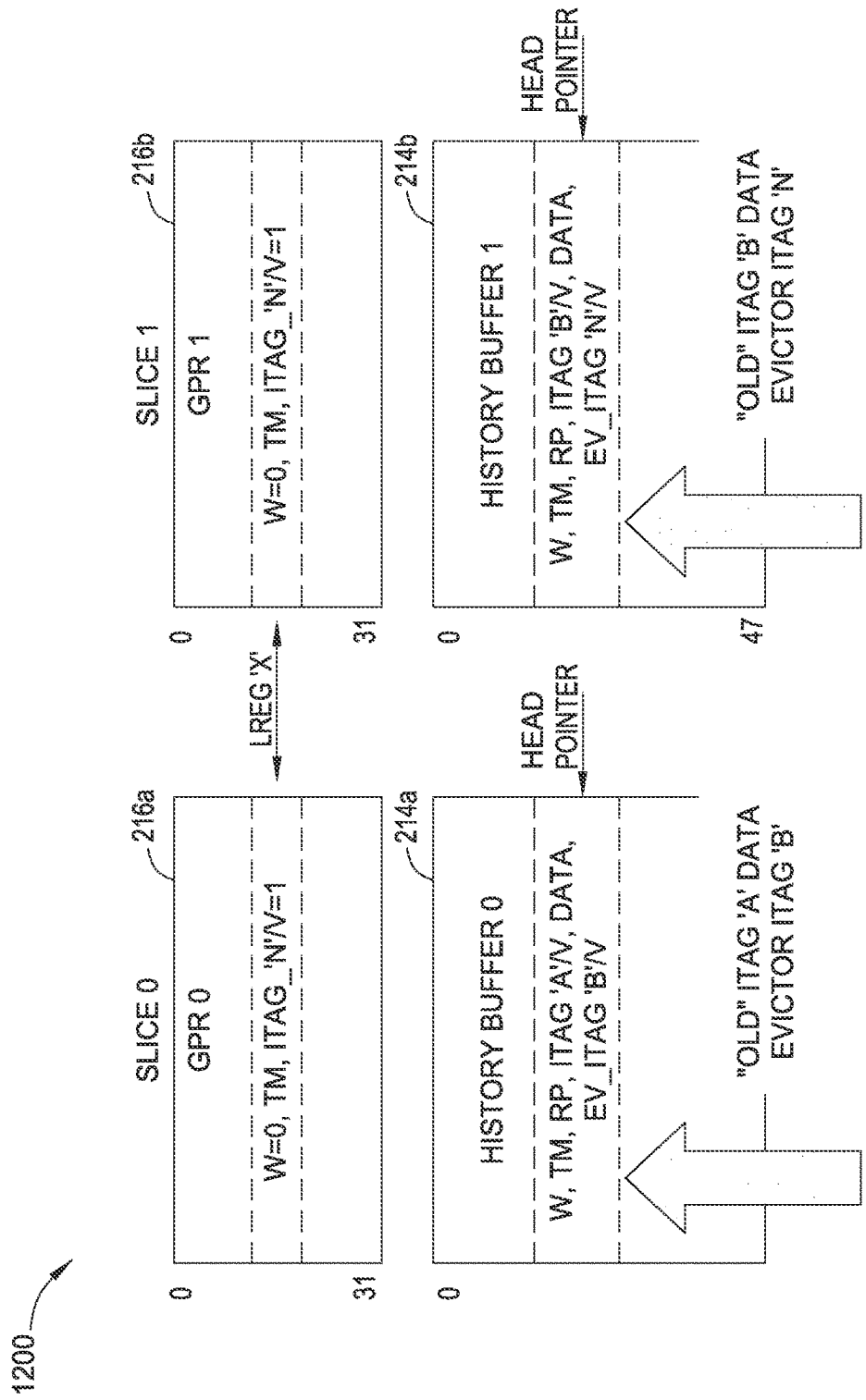
FIG. 12 illustrates example bypassing RF upon dispatching multiple targets to the same RF entry in one cycle, in accordance with certain aspects of the present disclosure.

FIG. 12 illustrates example 1200 bypassing RF upon dispatching multiple targets to the same RF entry in one cycle based on the example of Table-1, in accordance with certain aspects of the present disclosure. In an aspect, as both ITAG B and ITAG N are dispatched in a single cycle, the states of GPR0 (216*a*)-HB0 (214*a*) of Slice 0 and GPR 1 (216*b*)-HB1 (214*b*) of Slice 1 must be updated with the correct data and status/control bits in a single cycle. It may be noted that both GPR 0 and GPR 1 store data and control/status bits for the same RF entry, LREG X. As noted above, the updated data and control/status bits in each of the GPRs and HBs of the two slices must be as if ITAG B and ITAG N were dispatched sequentially in two different cycles. Thus, as shown, HB 1 of Slice 1 is written with old ITAG B data directly from the dispatch bus, without it being first written in to LREG X (GPRs 0 and 1) and then evicted out of the GPR. Further, ITAG N data is written into the GPR0 and 1. As shown control bits of HB 1 are updated with evictor ITAG N, as if the old ITAG B data was evicted out of GPR 1. The ITAG A data evicted out of GPR 0 is written into HB 0 and the control bits are updated with evictor ITAG B. It may be noted that the example of FIG. 10 considers dispatch of two instructions only for ease of illustration and discussion only, and that the bypass case may apply to any number of instructions dispatched in a single cycle targeting the same LREG entry.

Figure 13:
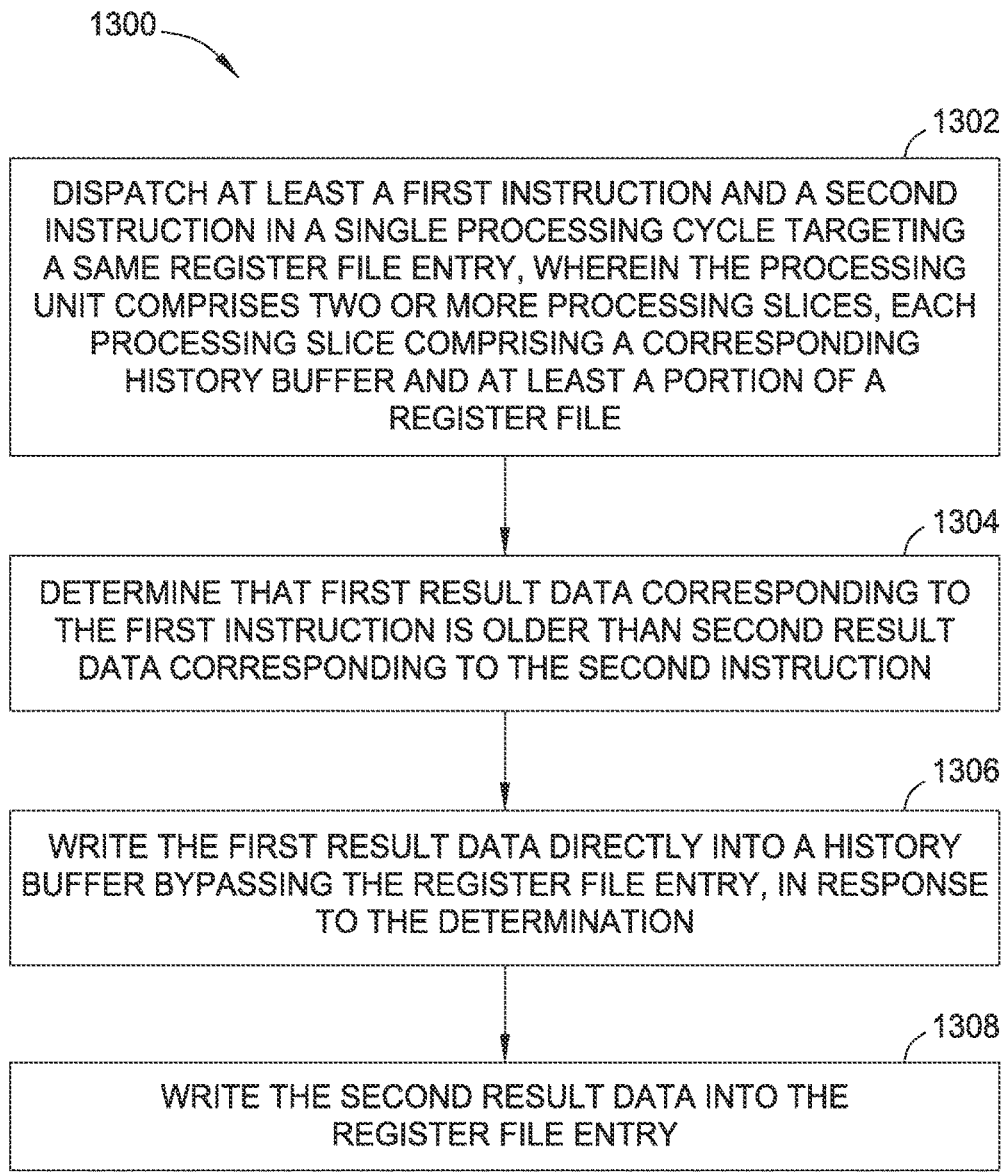
FIG. 13 illustrates operations that may be performed by a processing unit for bypassing RF upon dispatching multiple targets to the same RF entry in one cycle, in accordance with certain aspects of the present disclosure.

FIG. 13 illustrates operations 1300 that may be performed by a processing unit for bypassing RF upon dispatching multiple targets to the same RF entry in one cycle, in accordance with certain aspects of the present disclosure. Operations 1300 may begin, at 1302, by dispatching at least a first instruction and a second instruction in a single processing cycle targeting a same register file entry, wherein the processing unit comprises two or more processing slices, each processing slice comprising a corresponding history buffer and at least a portion of a register file. At 1304, the processing unit may determine that the first result data corresponding to the first instruction is older than second result data corresponding to the second instruction. At 1306, the processing unit may write the first data directly into a history buffer bypassing the register file entry, in response to the determination. At 1308, the processing unit may write the second result data into the register file entry.

In certain aspects, a logic unit (e.g., logic unit 208) may dispatch the first and the second instructions to first and the second processing slices of the processing unit. The first and second instructions may be issued to functional units (e.g., function units 304) in each processing slice for execution, and each functional unit may return result data (e.g., the first and second result data) on write back buses (e.g., buses 230) corresponding to the functional unit. A history buffer logic corresponding to the history buffer may perform an HB write back (e.g., as shown in FIG. 8) to write the first result data directly into the history buffer. Further, logic circuit at the register file may perform an RF write back (as shown in FIG. 7) to write the second result data into the register file entry.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for restoring results to a register file of a processing unit comprising:
    dispatching an instruction, in a processing slice of the processing unit, targeting a register file entry of the register file, wherein the processing unit comprises two or more processing slices, each processing slice comprising a corresponding history buffer and at least a portion of a register file;
    evicting previous result data from the register file entry to a history buffer corresponding to the processing slice, by writing new result data into the register file entry, in response to the instruction;
    detecting a trigger condition relating to a rollback of the processing unit to a previous state; and
    restoring the previous result data from the history buffer to the register file entry, in response to the trigger;
    comparing an evictor tag stored in the history buffer corresponding to the instruction with a flush tag; and
    setting the history buffer for a restore operation based on the comparison step.

2. The method of claim 1, wherein two or more history buffers of two or more processing slices may collectively store two or more result entries corresponding to the same register file entry, each of the two or more result entries being evicted out of the register file entry by a different instruction targeting the same register file entry.

3. The method of claim 1, wherein each instruction of a block of instructions can be dispatched to any one of the processing slices, wherein two or more instructions can be dispatched to two or more processing slices in a single processing cycle.

4. The method of claim 1, wherein each instruction is identified by a unique tag.

5. The method of claim 1, further comprising writing the new result data in a corresponding register file entry of each other register file of each other processing slice, wherein a state of each register file is identical after execution of the instruction.

6. The method of claim 1, wherein the trigger condition may comprise at least one of an exception, an error, a branch mispredict or an interrupt.

7. The method of claim 1, wherein each entry of the history buffer is identified by a unique tag, the tag being unique across two or more history buffers of the processing unit.

8. The method of claim 1, wherein each entry of the history buffer includes status bits comprising one or more of tag bits identifying an instruction to which the result data stored in a history buffer entry corresponds to, a valid bit indicating whether the tag is valid or not, one or more Written (W) bits indicating whether the result data is available or not, a producer bit indicating which execution unit issued the result data, one or more bits of a logical register (LREG) indicator identifying the register file entry for restoration of the result data, a restore pending (RP) bit indicating whether the result data is to be restored to the register file entry upon a trigger condition or not, or one or more evictor tag bits identifying an instruction that evicted the result data to the history buffer entry.

9. The method of claim 8, wherein evicting the previous result data from the register file entry to the history buffer comprises:
    comparing a write back tag received on each write back bus with a history buffer tag of each history buffer entry; and
    loading the result data into the history buffer entry in response to the write back tag matching the history buffer tag.

10. The method of claim 8, further comprising setting the RP bit to one if the tag identifying the history buffer entry is older than the flush tag, and the evictor tag is later than the flush tag.

11. The method of claim 8, further comprising:
setting the write back bits and the valid bit of the history buffer tag and the evictor tag to zero, if both the history buffer tag is older than a completion tag and the evictor tag is older than or equal to a completion tag.

12. The method of claim 1, further comprising:
comparing the evictor tag stored in the history buffer corresponding to the instruction with a completion tag; and
setting a valid bit of a tag corresponding to the previous result data stored in the history buffer and a valid bit corresponding to the evictor tag to zero, indicating that the previous result data is unavailable in the history buffer.

13. The method of claim 12, further comprising setting Written (W) status bits corresponding to the previous result data in the history buffer to zero.

14. A data processing system, comprising:
two or more processing slices;
at least one register file;
two or more history buffers, each processing slice comprising a corresponding history buffer and at least a portion of the at least one register file;
a logic unit for dispatching an instruction, in a processing slice of the processing unit, targeting a register file entry of the at least one register file;
at least one functional unit for receiving the dispatched instruction and providing new result data for writing into the register file entry, the at least one register file writing the provided new result data into the register file entry; and
a history buffer logic unit for writing previous result data, evicted by writing the new result data from the register file entry, to a history buffer corresponding to the processing slice,
the logic unit detecting a trigger condition relating to a rollback of the processing unit to a previous state, and restoring the previous result data from the history buffer to the register file entry, in response to the trigger, wherein the logic unit is further configured to:
compare an evictor tag stored in history buffer corresponding to the instruction with a flush tag; and
setting one of the two or more history buffers for a restore operation based on the comparison step.

15. The data processing system of claim 14, wherein the two or more history buffers of the two or more processing slices may collectively store two or more result entries corresponding to the same register file entry, each of the two or more result entries being evicted out of the register file entry by a different instruction targeting the same register file entry.

16. The data processing system of claim 14, wherein each instruction is identified by a unique tag.

17. The data processing system of claim 14, the history buffer writes the previous result data from the register file entry to the history buffer by:
comparing a write back tag received on each write back bus with a history buffer tag of each history buffer entry; and
loading the previous result data into the history buffer entry in response to the write back tag matching the history buffer tag.

18. The data processing system of claim 14, wherein the history buffer logic further performs:
comparing the evictor tag stored in the history buffer corresponding to the instruction with a completion tag; and
setting a valid bit of a tag corresponding to the previous result data stored in the history buffer and a valid bit corresponding to the evictor tag to zero, indicating that the previous result data is unavailable in the history buffer.

19. The data processing system of claim 18, the history buffer logic further sets Written (W) status bits corresponding to the previous result data in the history buffer to zero.

20. A computer program product for restoring results to a register file of a processing unit comprising, the computer program product comprising:
a computer-readable storage medium having computer-readable program code embodied therewith for performing method steps comprising:
dispatching an instruction, in a processing slice of the processing unit, targeting a register file entry of the register file, wherein the processing unit comprises two or more processing slices, each processing slice comprising a corresponding history buffer and at least a portion of a register file;
evicting previous result data from the register file entry to a history buffer corresponding to the processing slice, by writing new result data into the register file entry, in response to the instruction;
detecting a trigger condition relating to a rollback of the processing unit to a previous state; and
restoring the previous result data from the history buffer to the register file entry, in response to the trigger;
comparing an evictor tag stored in the history buffer corresponding to the instruction with a flush tag; and
setting the history buffer for a restore operation based on the comparison step.

* * * * *